Feb. 3, 1931. J. LEDWINKA 1,790,931
SLOTTED WINDOW FRAME AND CLOSURE STRIP
Filed Feb. 28, 1929

INVENTOR.
JOSEPH LEDWINKA
BY
ATTORNEY.

Patented Feb. 3, 1931

1,790,931

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

SLOTTED WINDOW FRAME AND CLOSURE STRIP

Application filed February 28, 1929. Serial No. 343,308.

My invention relates to a closure for the transverse slot of window frames in which the glass is slid up and down in vertically arranged channels at the sides of the window opening and removed from one end through such transverse slot. It is particularly applicable to such a window frame construction in which the slot is defined by a thin metal margin.

It is an object of my invention to provide a closure of this class which provides a neat appearance, is readily put into place and firmly held in place by its resiliency, thus requiring no separate fastening means, and is adapted at the same time to function as weather strip for the adjacent edge of the window glass.

I attain these objects by making the closure out of a strip of rubber or other elastic material formed along its opposite sides with grooves adapted to receive the edge of the slot in the frame, and along the side facing the window glass with a groove of a width and depth adapted to receive the adjacent edge of the window glass to form a weather proof closure therewith. Where the corners of the window frame are curved, and the groove extends into the curved portion, my invention also includes moulding the end portions of the strip to the curvature desired before the strip is applied. This insures an even and snug fit for the end portions as well as the relatively straight intermediate portion.

Figure 1:
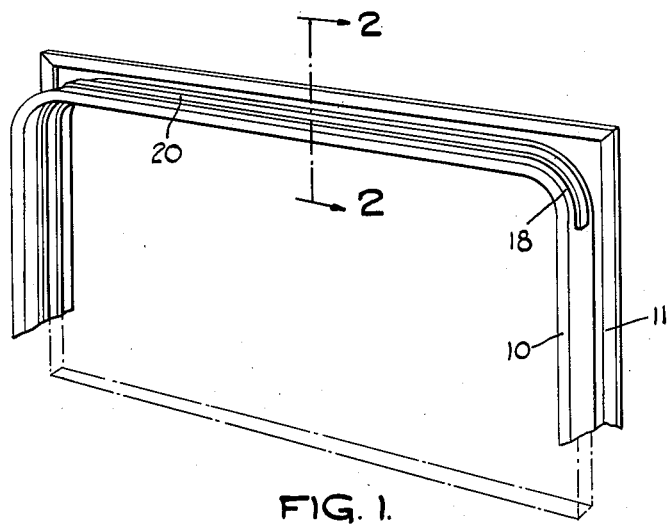
Figure 2:
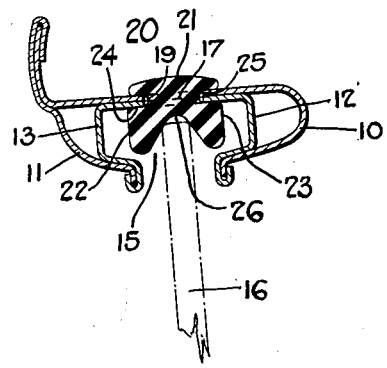

In the accompanying drawings I have shown one embodiment of my invention as applied to the top of a vehicle door. In them, Fig. 1 is a perspective view of the upper inside portion of the door having my invention applied thereto, and Fig. 2 is a cross-sectional view taken substantially on the line 2—2 of Fig. 1 through the top frame of the door.

The particular construction of the window frame to which my invention is shown applied is not material except as it cooperates with the novel closure.

The sides and top of the frame are formed, in the illustrated embodiment, of a sheet metal inner panel stamping 10, and outer panel stamping 11, and inner and outer glass run stampings 12 and 13. All of these parts extend around the sides and top of the window frame and are joined together in their margins to form a double hollow box section door frame structure, with a glass runway 15 intermediate the box sections. The glass panel 16 slides, as usual, in the vertical runways at the sides of the frame, and to allow its insertion into or removal from the door, the upper transverse portion of the frame, shown in section in Fig. 2, is slotted at 17, the slot extending around the curved corner portions 18 of the door. Thus a thin metal edge 19 extends all the way around the slotted opening. In the present door construction, this metal edge is of two thicknesses of metal, due to the overlapped relation of the inner panel 10, and the glass run stampings 12 and 13.

The closure strip for the slot is numbered generally 20 and is comprised of rubber or other resilient material shaped, in cross section, with a slightly rounded outer surface 21 to provide a neat appearance on the outside of the frame. The opposite side surfaces 22 and 23 are provided adjacent the outer surface 19 with grooves 24 and 25 to receive the edge 19 of the opening. On its inner side, the strip 20 is formed with a deep groove 26, in the present instance, of substantially V-shape in section. This groove receives the edge of the window glass 27 and forms therewith a weatherproof joint.

Where the corners of the window frame are rounded, as in this case, with the side of the glass panel 16 extending close to the edge of the frame, so that the slot extends into these curved portions, the rubber strip 20 is preferably, to secure a firm and secure seating and a neat exterior appearance, moulded to the shape of the curve at its end portions, prior to the securing of it in position.

The strip is readily brought into position by starting at one end thereof and pressing inwardly toward each other, the side portions 22 and 23 below the grooves 24 and 25, this being facilitated by the provision of the deep V-shaped groove on its inner side, and inserting the strip into the slot until the grooves register with the edges 19 of the slot, when the side portions 22 and 23 will return by their elasticity to the position shown in Fig. 2, locking the strip in place. After the end is inserted, the rest of the strip may be rapidly inserted by continuing the application of pressure on the opposite side portions thereof while pressing the strip laterally into the slot, until the opposite end is reached. The application of the strip is thus a matter of a few seconds and, when applied, it provides a neat finish, by its thin, rounded outer portion, to the outside of the frame, and is securely held in place by its elasticity, while also serving as a weather strip for the edge of the window.

What I claim is:

1. A window frame having a slot in one side thereof for insertion or removal of the window glass, together with resilient closure means engaging the edges of the slot and held in place by its resilience.

2. A window frame having a slot in one side thereof for insertion or removal of the window-glass, together with a resilient combined closure strip and weather seal engaging the edges of said slot and held in place by its resilience.

3. A closure for a glass removing or inserting slot for window frame comprising a resilient member moulded to the shape of the slot and formed with grooves adapted to engage the edge of the slot for holding it in place.

4. A window frame slot closure made of moulded rubber or the like, and grooved to receive the edge of the slot, and additionally to receive the edge of a window panel.

5. A window frame having rounded corners, and a slot in one side thereof extending into said rounded corners, together with an integral resilient combined closure strip and weather seal engaging the edges of said slot and closing the same, including the portions of the slot extending into said rounded corners.

In testimony whereof I hereunto affix my signature.

JOSEPH LEDWINKA.